Nov. 22, 1966 R. J. RABELER 3,287,501
MULTIPLEX DETECTOR CIRCUIT
Filed June 25, 1963
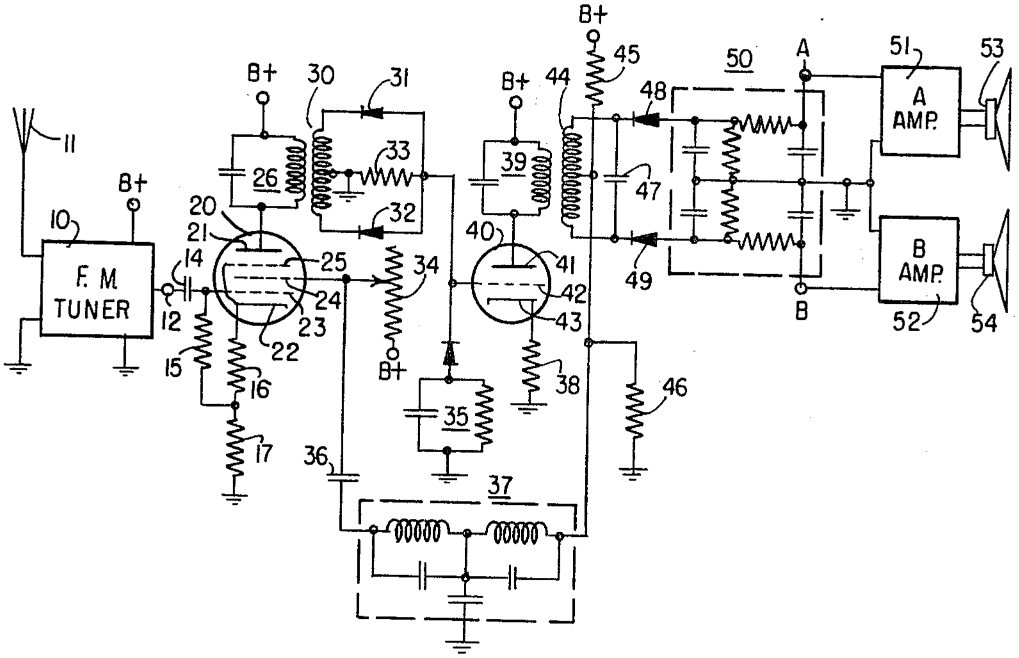
INVENTOR.
RICHARD J. RABELER
BY James T. Barr
ATTY.

United States Patent Office 3,287,501 Patented Nov. 22, 1966

3,287,501
MULTIPLEX DETECTOR CIRCUIT
Richard J. Rabeler, Northbrook, Ill., assignor to Admiral Corporation, Chicago, Ill., a corporation of Delaware
Filed June 25, 1963, Ser. No. 290,513
4 Claims. (Cl. 179—15)

This invention relates in general to frequency modulation multiplexing and in particular to an economical frequency modulation (FM) multiplex adapter arrangement. Recently the Federal Communications Commission (FCC) authorized frequency modulation broadcasters to institute FM stereo transmissions. The complete stereo signal comprises a left plus right audio summation component, a left minus right difference component which appears as an amplitude modulation of a 38 kilocycles per second (kc.) suppressed carrier, and a 19 kc. pilot component. The complete stereo signal, which is used to modulate the FM transmitter, thus comprises L+R audio information, sidebands of L—R difference information and a pilot component. Since there are numerous methods for generating a signal of this type, it follows that there are also numerous methods for recovering such a signal.

The FCC approved system was adopted to insure compatibility with existing monaural FM equipment. Thus the monaural listener hears the stereo program as a monaural one. Similarly a stereo set owner hears monaural programs also. While most FM receivers will soon have built in or integral multiplex detectors, there are also adapter kits which are available.

The circuit of the invention may be made integral with an FM receiver or embodied in an adapter kit therefor. While the environment of the invention includes envelope type detectors, it should be borne in mind that others of the well known types of detectors may be used with equal facility. For a complete description of the envelope detection method of demultiplexing a multiplexed signal see the co-pending application of Leonard Dietch, Serial No. 194,601, filed May 4, 1962, now U.S. Patent No. 3,154,641 issued October 27, 1964.

As is the case with most commercial equipment, there is a strong tendency to produce quality components at minimum cost, thus bringing the benefits thereof to a larger portion of the consumer market. Consequently, a short time ago, a multiplex adapter circuit was marketed which utilized only two tube functions. Although this circuit performed satisfactorily, it had a tendency to produce undesirable noise when operating in the multiplex mode since there was no inherent isolation between the regenerated carrier wave and the multiplex input circuit. The circuit of the invention obviates this deficiency while still maintaining a multiplex adapter circuit utilizing only two tube functions.

Accordingly, the principal object of this invention is to provide an improved multiplex adapter circuit;

Another object of this invention is to provide a multiplex adapter circuit which is productive of excellent results and yet is very economical to construct;

A further object of this invention is to provide an economical multiplex adapter circuit which inherently isolates the regenerated carrier wave from the input circuit.

A feature of this invention resides in a pentode vacuum tube input stage which has two separate output circuits, one for selecting the 19 kc. pilot signal and the other for selecting the composite signal.

A better understanding of this invention will be obtained from a detailed reading of the specification and claims together with the single drawing in which a schematic diagram of a multiplex adapter employing the invention, is shown.

Referring to the drawing, there is shown an FM tuner 10 having an antenna 11 and an output terminal 12. FM terminal 10 is for practical purposes a standard monaural type frequency modulation receiver. Upon reception of an FM multiplex transmission, output terminal 12 produces an L+R audio component, sidebands of an L—R amplitude modulation component and a 19 kc. pilot component. The input stage of the multiplex adapter comprises a pentode vacuum tube 20 having an anode 21, a cathode 22, a control grid 23, a screen grid 24 and a suppressor grid 25. Suppressor grid 25 is connected internally to cathode 22, which is connected to ground through a pair of resistors 16 and 17. Terminal 12 is connected through a coupling capacitor 14 to grid 23 which has a grid leak resistor 15 connected to the junction of resistors 16 and 17. Resistor 16 is the cathode resistor and resistor 17 improves the input impedance of tube 20. A tuned circuit 26, which is tuned to the 19 kc. pilot component, is connected between a B+ source (not shown) and anode 21. Screen grid 24 is connected through a variable resistance 34, to a source of B+, and through a coupling capacitor 36 to an SCA filter 37. The letters SCA mean Subsidiary Carrier Authorization which refers to a higher frequency multiplexed signal utilized by some stations for transmitting background music, etc. to various commercial establishments. SCA filter 37 is thus designed to eliminate any such transmissions from the home receiver. The output of SCA filter 37 is connected to a voltage divider comprising resistors 45 and 46.

Pentode 20 is operated as a normal pentode amplifier (with a degenerated screen grid) for the 19 kc. pilot component and as a tridode amplifier (from cathode to screen grid) for the composite signal. Thus, only the19 kc. component appears across tuned circuit 26. Variable resistance 34, which corresponds to the load resistor for the triode comprising cathode 22, control grid 23 and screen grid 24, enables the amplification of the composite signal to be varied. In an integrated unit variable resistance 34 would not be required as its value may readily be optimized. However, in an adapter version, a variable composite gain control is advantageous to correct for differing characteristics in the FM tuners with which the adapter may be used.

Winding 30, having a grounded center tap, is coupled to tuned circuit 26 and has its extremities connected to a pair of diodes 31 and 32 which feed a load resistor 33. This arrangement provides full wave rectification of the 19 kc. signal coupled from tuned circuit 26 and thus produces a 38 kc. carrier wave. It should be noted that the phase of the 19 kc. pilot component is very important and care must be exercised to minimize any phase shift in amplifying the19 kc. pilot and regenerating the 38 kc. carrier wave.

The 38 kc. carrier wave is coupled to grid 42 of a triode amplifier 40 which is essentially a standard 38 kc. amplifier. A clipper arrangement 35 is connected to grid 42 and serves to eliminate any noise amplitude modulation, which may be present in the regenerated 38 kc. wave. Cathode bias is provided by cathode resistor 38. A tuned load circuit 39 is connected from B+ to anode 41 and is tuned to 38 kc. Thus, the developed or regenerated 38 kc. carrier wave is amplified in triode 40 and appears across tuned circuit 39.

A center tapped winding 44 is coupled to tuned circuit 39. Its center tap is connected to the voltage divider comprising resistors 45 and 46, which, it will be recalled is also fed from the output of SCA filter 37. Thus both the composite signal and the regenerated 38 kc. carrier wave are coupled to winding 44. It should be noted that the regenerated 38 kc. carrier wave is quite large in comparison with the composite signal and is recombined therewith in the proper phase relationship such that the original L signal is defined by one polarity of peaks of the 38 kc. carrier wave and the original R signal by the opposite polarity of peaks of the 38 kc. carrier wave. This action is completely discussed in the aforementioned application of Leonard Dietch.

Winding 44 has a capacitor 47 coupled thereacross which is used to tune the winding to 38 kc. The extremities of winding 44 feed a pair of diodes 48 and 49. The outputs of these diodes are connected to a circuit 50 which includes appropriate diode load resistors and bypass resistors, and de-emphasis networks, all of which are well known in the art. The end result is that the diodes function as envelope detectors for the composite signal with the regenerated 38 kc. carrier and the individual modulating signals appear at terminals A and B, respectively. In practice these signals correspond to the original L and R audio information. Thereafter the signals are fed through appropriate amplifiers and speaker arrangements for audio reproduction. In the drawing the A amplifier is labelled 51 and the B amplifier is labelled 52. The output of amplifier 51 is coupled to a speaker 53 and the output of amplifier 52 is coupled to a speaker 54.

In summary the composite signal is coupled to the pentode vacuum tube where the 19 kc. component is amplified and substantially separated. Perfect separation is not achieved and some 19 kc. component stays with the composite signal. This small amount of 19 kc. does not adversely affect the audio reproduction. The pilot component is then full wave rectified to double its frequency and further amplified, thus regenerating the 38 kc. suppressed carrier. The composite signal is also amplified by the cathode, control grid and screen grid of the pentode and is taken off from the screen grid. Both the regenerated 38 kc. carrier wave and the composite signal are recombined in winding 44 and envelope detected to produce the separate L and R signals.

It should be noted that the entire demultiplexing function has been performed with only two tube functions being utilized. Further it should be noted that inherent isolation has been achieved by providing two output circuits for the pentode amplifier. Thus, disturbances in the triode section of the amplifier are substantially eliminated from tuned circuit 26 and the objectives enumerated above are attained.

What has been described is a novel FM multiplex detector circuit which is productive of excellent results with minimum cost. It may be noted that numerous modifications and departures in the disclosed embodiment of the invention may be made by those skilled in the art without departing from its true spirit and scope as defined in the claims.

The embodiments of the invention in which an exclusive property or privilege is claimed are defined as follows:

1. A demultiplexer for deriving separate A and B signals from a composite signal including an A+B component, a suppressed carrier amplitude modulation A—B component and a pilot component representative of said carrier; a pair of electron discharge devices; a first of said electron discharge devices having an input circuit consisting of a cathode and control grid and two output circuits a first of which consists of said cathode and an anode and a second of which consists of said cathode and a screen grid; means coupling said composite signal to said input circuit; tuned circuit means, responsive to said pilot component, connected in said first of said output circuits; demodulation means coupled to said second of said output circuits; said second electron discharge device regenerating said carrier under control of said pilot component and having an output circuit coupled to said demodulation means, whereby said regenerated carrier is reinserted in proper phase into said composite signal and said A and B signals are separately derived.

2. In combination; means translating a composite signal including an A+B component, a suppressed carrier-amplitude modulation A—B component, both said components being developed from a signal A and a signal B, and a pilot component representative of said carrier; a pentode vacuum tube including a cathode, a control grid, a screen grid and an anode; means coupling said composite signal between said cathode and said control grid; a first output circuit, including said cathode and said anode, having a tuned circuit tuned to the frequency of said pilot component developing an amplified pilot signal; a second output circuit, including a potentiometer and said cathode and said screen grid, amplifying said composite signal; frequency changing means coupled to said first output circuit developing a continuous wave signal related in frequency and phase to said pilot signal; and envelope detection means coupled to both said frequency changing means and said second output circuit for detecting separate A and B signals, the provision of said two output circuits providing isolation between said continuous wave signal and said composite signal.

3. In combination; means for translating a composite signal including an A+B component, a suppressed carrier amplitude modulation A—B component, both said components being developed from a signal A and a signal B, and a pilot component representative of said carrier; a pentode vacuum tube including an input circuit and first and second output circuits, both said output circuits having voltage gain with respect to said input circuit; tuned circuit means responsive only to said pilot component connected in said first output circuit; means in said second output circuit translating said composite signal; means coupled to said first output circuit regenerating a carrier related in frequency and phase to said pilot component; and demodulation means combining said regenerated carrier and said composite signal to produce separate A and B signals.

4. The combination as claimed in claim 3 wherein said means in said second output circuit include a potentiometer for varying the amplitude of the translated composite signal to allow compensation for differing average signal level amplitudes applied to said input circuit.

References Cited by the Examiner

UNITED STATES PATENTS

| | | | |
|---|---|---|---|
| 3,152,224 | 10/1964 | Cotsworth | 179—15 |
| 3,167,615 | 1/1965 | Wilhelm et al. | 179—15 |
| 3,198,885 | 2/1965 | Limberg | 179—15 |
| 3,225,143 | 12/1965 | Parker | 179—15 |
| 3,233,044 | 2/1966 | Hopper | 179—15 |

DAVID G. REDINBAUGH, *Primary Examiner.*

ROBERT L. GRIFFIN, *Examiner.*